United States Patent [19]
Pass et al.

[11] 3,916,156
[45] Oct. 28, 1975

[54] BADGE AND TAB CARD READER

[75] Inventors: Raymond Vincent Pass, Camp Hill; Daniel Joseph Crowley, Harrisburg, both of Pa.

[73] Assignee: AMP Incorporated, Harrisburg, Pa.

[22] Filed: Nov. 8, 1974

[21] Appl. No.: 521,991

Related U.S. Application Data

[63] Continuation of Ser. No. 354,428, April 25, 1973.

[52] U.S. Cl. .............................. 235/61.11 A; 200/46
[51] Int. Cl.$^2$ ...................... G06K 7/04; H01H 43/08
[58] Field of Search ................ 235/61.11 R, 61.11 A, 61.11 C, 235/61.7 B; 340/149 A; 200/46

[56] References Cited

UNITED STATES PATENTS

| | | | |
|---|---|---|---|
| 3,139,519 | 6/1964 | Reinschmidt, Jr. | 235/61.11 A |
| 3,148,251 | 9/1964 | Burke | 235/61.11 A |
| 3,433,932 | 3/1969 | Rolke | 235/61.11 A |
| 3,459,904 | 8/1969 | Friend | 235/61.11 A |
| 3,462,567 | 8/1969 | Brown | 235/61.11 A |

*Primary Examiner*—Daryl W. Cook
*Attorney, Agent, or Firm*—Gerald K. Kita

[57] ABSTRACT

An apparatus is disclosed which is particularly suitable for reading both relatively thick plastic identification cards as well as relatively thin paper data cards. The apparatus includes a movable read head carrying an array of contact fingers which are adapted to sense apertures punched in identification or data cards. Insertion of a card into the device cocks a card ejector mechanism and triggers a solenoid actuating switch which causes a solenoid to pivot the contact carrying frame into engagement with the card. Contacts carried by the frame which do not engage apertures in the card hold the card in position, while contacts which engage apertures pass through the card and make contact with a suitable printed circuit board to provide the necessary card reading output. Subsequently, the solenoid is released and the card is ejected by the ejector mechanism.

9 Claims, 4 Drawing Figures

BADGE AND TAB CARD READER

This is a continuation, of application Ser. No. 354,428 filed Apr. 25, 1973.

BACKGROUND OF THE INVENTION

1. Field of the Invention:

This invention relates generally to aperture card readers, and more particularly to an aperture card reader which is suitable for reading cards of varying thicknesses.

2. Description of the Prior Art:

Circumstances exist in which it is desirable to use an identification or credit card to establish the identity of a particular individual, and subsequently to carry out a transaction based upon data punched into a conventional paper data card. In these circumstances separate card readers have often been required in the past to read the identification card and the data bearing card in view of the fact that plastic identification cards are often substantially thicker than conventional paper data bearing cards. For example, plastic identification cards are generally approximately 30 thousandths (0.030) of an inch thick, while paper cards are customarily approximately 7 thousandths (0.007) of an inch thick. Since a large number of the card reading devices available in the past, particularly punched card readers, have lacked the capacity to read cards over such a wide range of thicknesses, a need exists for a card reader which can accommodate both types of cards without requiring any adjustment so that thick and thin cards can be used in rapid succession without requiring any adjustment to the card reading apparatus.

Some card readers which are adaptable to reading cards of varying thicknesses have been known in the past, but these are generally impractical for wide spread distribution and manufacturing in quantity because of their high cost. It is of course understood by those skilled in the art that aperture card readers are very precise instruments since they must provide registration between a large number of reading contacts and the various rows and columns of punched apertures in the cards being read. Therefore it is not a simple matter to produce an adjustable card reader which maintains the necessary accuracy of registration between the reading contacts and the card apertures. As a result the adjustable aperture card reading devices known in the past have generally included relatively complicated mechanisms to insure the necessary precise alignment in the adjustable reading apparatus. Such complicated mechanisms have two important drawbacks. First, they require substantially more parts causing them to be more susceptible to failure, and also rendering them less rugged and reliable and therefore less suitable for installations where many unskilled individuals are to use them. Furthermore, the more complicated mechanisms often include a large number of adjustment features which in time tend to wear or become loosened resulting in misalignment between the reading mechanism and the cards to be read, and causing serious readout errors to occur. Second, the use of larger number of parts substantially increases the cost of these more complicated mechanisms since not only must a large number of parts be produced, but they also must be assembled resulting in extremely high labor costs in addition to relatively high hardware costs.

There is consequently a need for an improved type of aperture card reader which is capable of reading both relatively thick and relatively thin cards without any adjustment, and which is highly reliable, inexpensive to manufacture, and requires a minimum of parts in its assembly.

SUMMARY OF THE INVENTION

Accordingly, one object of this invention is to provide a novel aperture card reader which overcomes the limitations of prior art apparatuses described above.

Another object of this invention is the provision of a novel aperture card reader which is capable of reading aperture cards of varying thicknesses.

A still further object of this invention is the provision of a novel aperture card reader which is automatically activated by the insertion of a card.

Yet another object of this invention is the provision of a novel aperture card reader including a card ejecting apparatus.

A still further object of this invention is the provision of a novel aperture card reader which is highly reliable and requires a minimum number of parts in its assembly.

A still further object of this invention is the provision of a unique aperture card reader including a reading head which is self-aligning during the assembly of the apparatus, and requires no fine adjustment.

A still further object of this invention is the provision of a unique operating mechanism for a movable aperture card reading head.

A still further object of this invention is the provision of a novel bearing and biasing assembly for a movable reading head in an aperture card reader.

Yet another object of this invention is the provision of a novel solenoid operating mechanism for controlling a movable reading head in an aperture card reader.

Briefly, these and other objects of the invention are achieved by providing a read head frameword containing an array of resilient reading contacts. The framework is mounted through a pair of axle pins in an elongated slot in a bearing plate. A pair of leaf springs biases the frame away from a card engaging position. A printed circuit board is provided beneath the card reading station, and is designed to form a contact surface with the card reading contacts as they pass through apertures in a card being read to provide suitable output signals. A card guide is provided for insuring proper positioning and orientation of cards inserted into the apparatus. In operation, a card is inserted into the apparatus causing card ejector mechanism to be cocked. When the card is fully inserted into the apparatus a switch arm is triggered actuating a solenoid which causes the frame carrying the reading contacts to be lowered by the solenoid against the force of the leaf biasing springs so that a large number of resilient reading contacts engage the surface of the card. The reading contacts engaging the card hold it in position against the force of the ejecting mechanism, while reading contacts which fall into alignment with card apertures penetrate the card and engage the printed circuit board, causing readout signals to be generated. The readout signals also release the solenoid, lifting the reading head and reading contacts out of engagement with the card, and permitting the ejecting mechanism to force the card at least partly out of the card reader mechanism. Alternatively, the card may be retained and the solenoid held until a positive ejection signal is transmitted from a remote station or switch external to the reading contacts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENT

Figure 1:
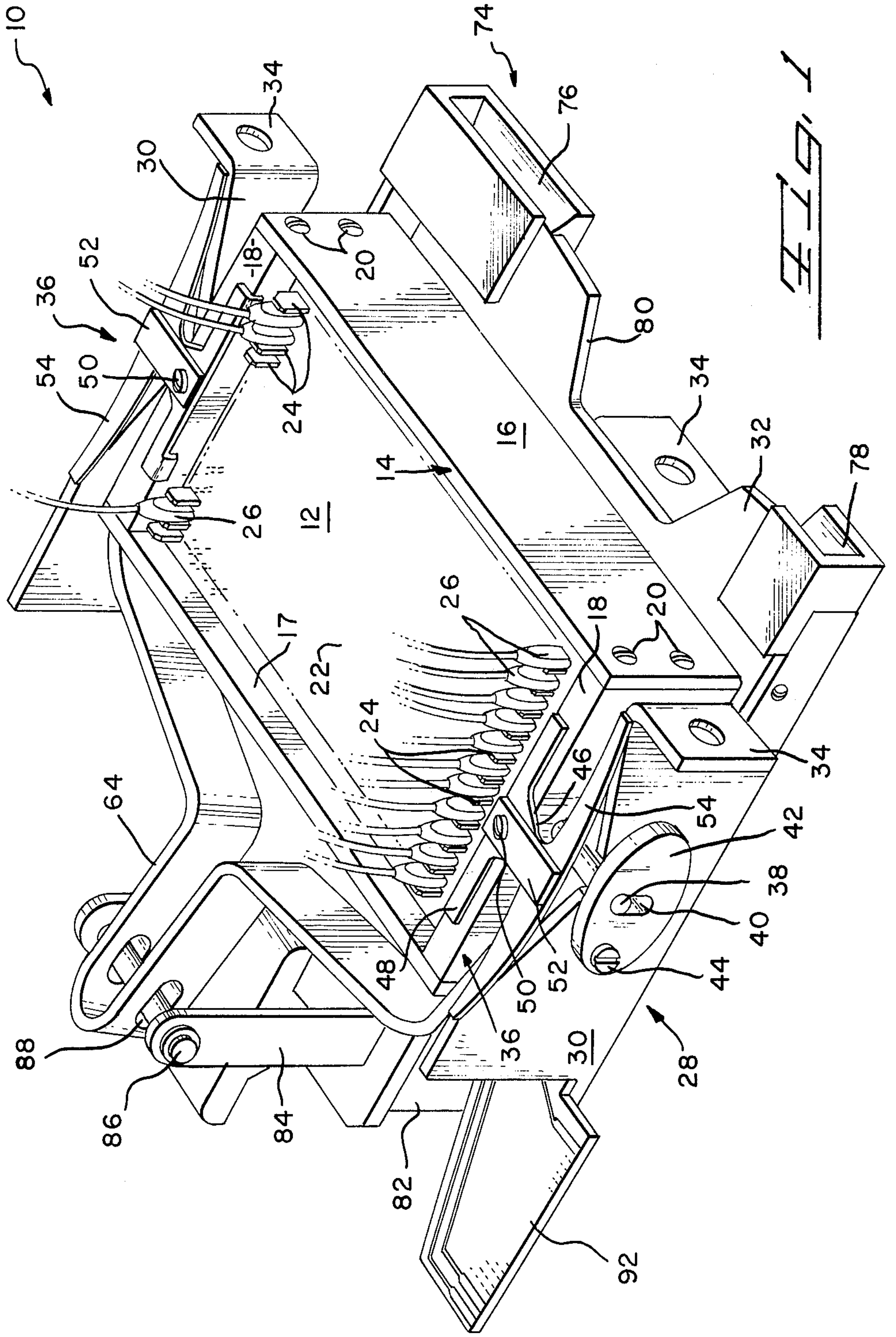
FIG. 1 is a perspective illustration of a preferred embodiment of the card reader of the present invention showing in particular the contact carrying frame, card guides bearing plates and lever mechanism of the apparatus.

Referring now to the drawings, wherein like reference numerals designate identical or corresponding parts throughout the several views, and more particularly to FIG. 1 thereof, a preferred embodiment of the card reading apparatus of the present invention is illustrated generally by the reference numeral 10. The card reader 10 includes a read head 12 which is surrounded by a frame 14. The frame 14 includes front and rear panels 16 and 17 coupled to side panels 18 by means of suitable screws or bolts 20, or other suitable fastening means to form an enclosed rectangular area. Within this area is a body of insulating material in which are captured or mounted an array of resilient reading contacts. The contacts have connector tabs 24. Lead wires 26 are preferably coupled to the connector tabs 24 to connect them with a suitable source of potential. Not all of the connector tabs 24 are shown coupled to lead wires 26 in the drawing for purposes of clarity. However, it will be understood that when the device is operational each column of reading contacts should be coupled by a tab through a lead wire to a suitable potential source. The number of connector tabs 24 can vary within reasonable limits. However, in the preferred embodiment illustrated there are preferably a number of columns, each containing twelve connector tabs. The number of columns and rows of reading contacts is selected so that the dimensions of the read head substantially conform to the size of a conventional credit or identification card, that is approximately 2 inches by 3 inches. Larger paper data bearing cards cannot, of course, be fully inserted into the apparatus. However the first 22 columns of such cards can be read by the apparatus. Thus data intended to be read by the apparatus of the present invention must be punched into the first 22 columns of conventional paper data cards.

The read head 12 is movably mounted to a structural frame 23 including side portions 30 and a bottom portion 32. The structural frame 28 is preferably made of metal, and the side portions 30 and the botom panel 32 are preferably formed of a single sheet of metal which is bent into a generally U-shaped configuration. The frame is also bent to include a group of mounting fixtures 34 to facilitate mounting the card reader or securing it to other apparatuses.

The read head 12 is coupled to the structural frame 28 by means of a pair of leaf spring assemblies 36 and a pair of guide pins 38 positioned in elongated apertures 40 in a pair of bearing plates 42. The bearing plates 42 are secured to the side portions of the structural frame 28 by means of screws 44 or other suitable fastening means. The leaf spring assemblies 36 include a generally T-shaped leaf spring 46 having a base portion 48 mounted to the side panels 18 of the read head frame 14 by means of a screw 50 and a rigid arm 52. The T-shaped leaf spring 46 also includes a main spring arm 54 forming the top of the T and slidably engaging the top surface of the side portions 30 of the structural frame 28.

Figures 3, 4:
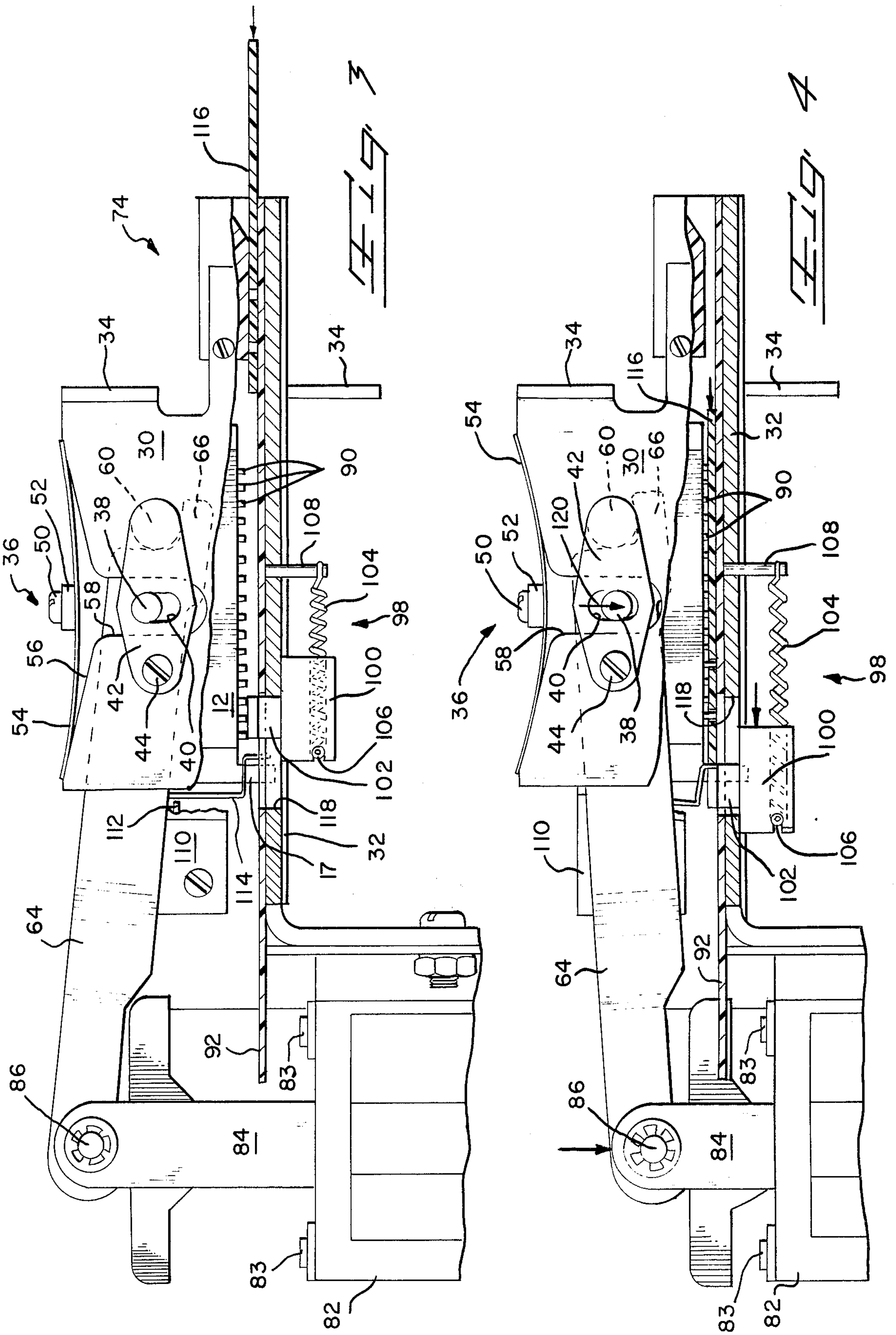
FIG. 3 is a partially cut-away side view of the apparatus illustrated in FIGS. 1 and 2 showing the reading head in "open" position, and illustrating the manner in which a card is inserted into the mechanism; and, FIG. 4 is a partially cut-away side view similar to that of FIG. 3 but illustrating the reading head in a "closed" position wherein the reading contacts are in full engagement with the card as during a reading operation.

Referring now particularly to FIGS. 3 and 4, it is seen that the upper surface of each of the side portions 30 of the structural frame 28 slopes downwardly along an inclined surface 56 toward a central slot 58. A space is thus formed between the inclined surface 56 and the main spring arm 54 as shown most clearly in FIG. 3, providing room for the spring arm to flex in a downward direction, as illustrated in FIG. 4. A slot 58 in each of the side portions 30 provides an opening to permit guide pins 38 to pass unobstructed through the side portions 30 to cooperate with the bearing plates 42.

Each of the bearing plates 42 includes a cylindrical bearing member 60 which fits through a suitable aperture 62 in the sidewall portions 30 so as to protrude partially inside the side portions 30 of the structural frame 28. A solenoid lever 64 is coupled to the read head 12 for the purpose of moving it. The solenoid lever 64 is of a generally U-shape having extended fingers 66 at opposite ends thereof (See FIGS. 3 and 4) for engaging the cylindrical bearing members 60 and for pivoting about these members. Each of the guide pins 38 passes through the solenoid lever 64 and thus moves with the lever.

Figure 2:
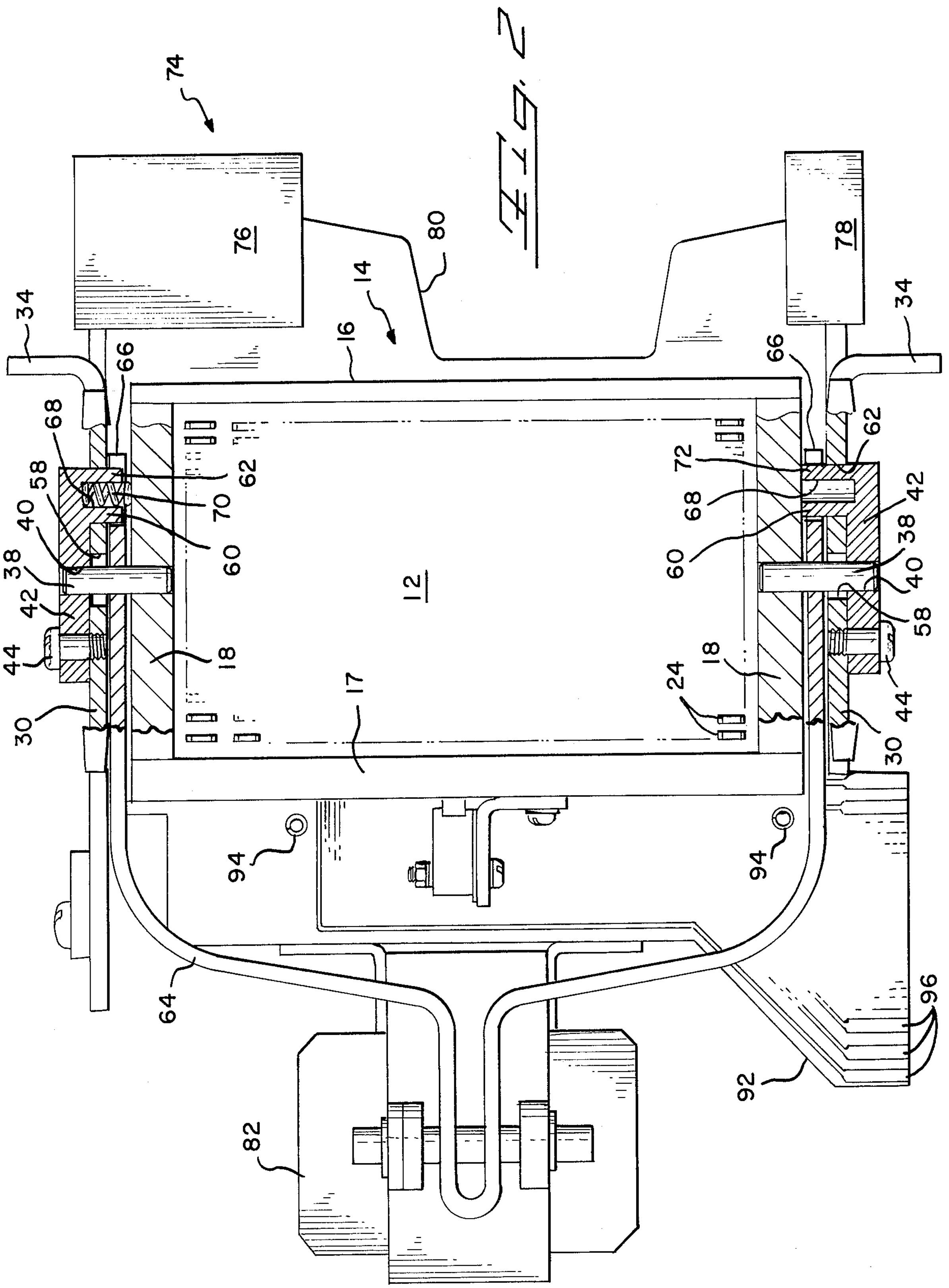
FIG. 2 is a partially cut-away top view of the apparatus shown in FIG. 1 showing the interior of the bearing plate structure in greater detail.

Referring now to FIG. 2, each of the cylindrical bearing members 60 includes an internal bore 68. The internal bore 68 of the lower bearing plate 42 is left empty, while a coil spring 70 is positioned in the internal bore 68 of the upper bearing plate 42. The purpose of the single coil spring 70 is to bias the read head 12 toward one side of the frame 28 which is known as the "alignment" side. When biased in this manner one side panel 18 of the read head frame 14 is engaged by the coil spring 70, while the other side panel 18 engages an outer annular surface 72 of the cylindrical bearing member 60 at the alignment side of the apparatus. The purpose of using the single coil spring 70 to effect the alignment of the apparatus is to simplify the apparatus and its assembly while simultaneously improving the reliability and accuracy of the completed device. More particularly, as was pointed out hereinabove, in an aperture card reader of the type disclosed alignment of the various reading contacts with the proper columns in data cards is very important to provide an accurate output. In the present invention all alignment measurements are made from the alignment side of the apparatus and the read head is constructed to be properly positioned when it abuts the alignment side of the apparatus. The single spring 70 insures that the read head will at all times abut the alignment side of the apparatus, and thus insures that the read head will always remain properly aligned with respect to the frame. This effective mechanism is assembled very simply since it is only necessary to insert the coil spring 70 into the internal bore 68 of the proper bearing plate, and then mount the read head 12 in place. The spring 70 then creates the proper alignment of the read head automatically, without need for delicate manual adjustments. In this regard it is pointed out that the main spring arms 54 are slidably mounted on the side portions 30 of the frame 28 so that the spring 70 merely slides these springs to the proper position as the small alignment adjustment is automatically made subsequent to assembly of the apparatus and maintained as long as the apparatus is in use.

Referring particularly to FIGS. 1 and 2, a card guide 74 consisting of a large guide segment 76 and a small guide segment 78 is provided to insure proper alignment of each card inserted into the apparatus. More particularly, the card guide is properly aligned with respect to the frame to insure that each card inserted into the reader is properly aligned with the read head 12. A finger notch 80 is provided in the frame 28 to facilitate full insertion of small identification cards into the card reader.

A conventional solenoid 82 is coupled through a driving arm 84 and an axle pin 86 to the solenoid levers 64. An elongated aperture 88 is provided in the bight portion of the solenoid lever 64 to permit the necessary lost motion between the linear movement of the driving arm 84 and the slightly arcuate movement of the solenoid lever 64.

Attention is now directed to FIGS. 3 and 4 which illustrate the apparatus of the present invention in a partially cut-away side view. Referring in particular to FIG. 3, the lower portion of the read head 12 is shown having a plurality of contacts 90 protruding from the lower surface thereof. The contacts 90 are electrically coupled to the contact tabs 24 which protrude from the upper surface of the read head 12 as shown in FIG. 1. However, while the contact tabs 24 are rigidly mounted to the read head 12, the contacts 90 are resiliently mounted to permit a vertical motion of slightly more than 30 thousandths (0.030) of an inch, i.e., a vertical motion which is greater than the thickness of the thickest card to be used in the card reader. A printed circuit board 92 is mounted by means of a plurality of spring pins 94 (See FIG. 2) to the inner surface of the bottom portion 32 of the structure frame 28. The printed circuit board has a pattern of conductive paths printed thereon which forms a contact surface with the contacts 90 to provide an appropriate electrical readout of cards inserted into the apparatus. An appropriate logic network of a conventional type is preferably coupled to a plurality of output contacts 96 of the printed circuit board 92 for processing the electrical output signals derived from the printed circuit board.

A card ejector mechanism 98 is illustrated in FIG. 3 in its "rest" position as including a body portion 100 slidably mounted to the bottom portion 32 of the structural frame 28, and having an ejecting finger 102 protruding from the top surface thereof into the reading station of the card reading apparatus. A coil spring 104 is coupled to the body portion 100 by means of a spring pin 106, and is also secured to the bottom portion 32 of the structural frame by means of a peg 108 which is fixedly mounted in the bottom portion of the structural frame.

A full insertion switch 110 is provided for actuating the solenoid 82 when a card to be read is fully inserted into the apparatus. The full insertion switch 110 includes a switch actuating button 112 which is triggered by a switch arm 114 which extends into the reading station of the apparatus, near the rear panel 17 of the read head frame 14.

The operation of the apparatus of the present invention will now be described with particular attention to the apparatus as illustrated in FIGS. 3 and 4. In FIG. 3 the apparatus is illustrated with the read head in a raised or "open" position as it would be prior to receiving a card to be read. A data bearing card 116 is shown being inserted through the card guide 74 into the reading station of the apparatus. As the card 116 is inserted into the apparatus, it slides freely along the upper surface of the printed circuit board 92 until its leading edge engages the ejecting finger 102 of the card ejector mechanism 98. The person inserting the card must then exercise a slight additional force to slide the ejecting finger 102 in a rearward direction through its guiding slot 118 against the biasing force of coil spring 104. As the card ejector mechanism 98 is pushed rearward, the ejecting finger 102 remains in engagement with the leading edge of the card 116, but does not engage the switch arm 114 as it slides to the rear of the apparatus. However, when the card 116 is fully inserted into the apparatus, its leading edge engages the switch arm 114 causing the switch arm to be pushed to the rear until the leading edge of the card engages the rear wall 17 of the read head frame 14. At this point the card cannot be further inserted into the apparatus, however, at this point the switch arm 114 has been moved a sufficient distance to press the switch actuating button 112, triggering the full insertion switch 110. The full insertion switch 110 causes activation of the solenoid 81 which attracts the driving arm 84 in a downward direction, as shown in FIG. 4. The driving arm 84 draws the solenoid lever 64 downward in a slight arcuate motion, causing it to pivot about the cylindrical bearing members 60, thus carrying the guide pins 38 in a downward direction, as shown by an arrow 120 in FIG. 4. Since the guide pins 38 are rigidly coupled to the read head frame 14, the read head frame 14 is drawn downwardly against the biasing force of the main spring arms 54 which ride on the upper surface of the side portions 30 of the structural frame 28. As the read head 12 is moved downwardly by the solenoid 82, the contacts 90 first come into engagement with the upper surface of the card 116, frictionally engaging the card, and holding it in position against the biasing force of the coil spring 104 coupled to the ejector mechanism 98. The read head 12 then continues downwardly to the limit of its travel, which is established by the closed position of the solenoid 82 seated against the stops shown at 83, at which point the read head frame 14 is positioned a very slight distance away from the upper surface of the card 116. In this position the contacts 90 are firmly biased into engagement with the upper surface of the card 116, except where apertures are formed in the card 116. At the positions of the apertures, the contacts 90 protrude through the card 116 and engage the printed circuit board 92, completing a plurality of circuits from the lead wires 26 through the connector tabs 24, the contacts 90 and the conductive paths on the printed circuit board to the output contacts 92. Thus, a suitable output signal representing the data punched in the card is derived from this readout. Release of the solenoid may be actuated by a transmitted signal from a remote station or switch external to the output contacts 96.

It should be realized the entire motion of the apparatus from the open position to the closed or reading position requires only about 1/50 of a second. In essentially another 1/50 of a second the device is opened at the completion of the reading operation. Thus as soon as the solenoid is released, the biasing force of the main spring arms 54 draws the read head 12 in an upward direction causing the contacts 90 to be withdrawn from engagement with the card 116, whereby the ejector mechanism 98 is released so that the biasing force of the coil spring 104 can cause the ejecting finger 102 to at least partially force the card 116 out of the card reader, so that it can be easily grasped and removed from the card guides.

It should be noted that the technique by which the present apparatus holds the cards in position in the card reader substantially eliminates any wear on the cards or to the apertures through the cards, so that they can be used many times without giving false or incorrect readings. In other words, the cards are not held in position by contacts 90 passing through the apertures in the cards. Rather, the uniform friction of a large number of contacts engaging the surface of the cards hold the cards in position, so that there is substantially no wear on the edges of the apertures through the cards. Furthermore, the resilient nature of the contacts 90, and the manner in which they grip cards inserted into the apparatus permits the reading of cards of varying thicknesses without requiring any adjustment to the apparatus. In addition, the apparatus of the present invention, as clear from the description above, requires a minimum number of parts, and therefore can be assembled with relative ease. Furthermore, the automatic alignment feature of the present invention enables the card reader to be assembled and maintained in precise alignment without need for any manual adjustments, so that the apparatus of the present invention will never become misaligned or require adjustment regardless of how many times it is used. The self-centering or self-alignment feature of the present invention is accomplished with an absolute minimum number of parts because of the design of the present invention which permits limited movement of all junctions between the read head 12 and the structural frame 28, and yet provides a cohesive and rigidly assembled structure which is rugged and reliable. For example, the sliding relationship between the main spring arms 54 and the side portions of the structural frame 28 permits a firm biasing coupling arrangement to be achieved, yet does not require the biasing spring arms 54 to be rigidly secured to the frame, thus, a certain sliding motion is permitted in the assembly of the apparatus whereby the spring arms may be moved slightly, yet retain the necessary engagement with the structural frame 28. The simplicity of the bearing plates, and the ease with which they are assembled to the structural frame 28 is also of significance regarding the greatly simplified manner of assembling the apparatus disclosed.

Obviously, numerous modifications and variations of the present invention are possible in light of the above teachings. It is therefore to be understood that within the scope of the appended claims the invention may be practiced otherwise than as specifically described herein.

What is claimed is:

1. A self-aligning card reader mechanism for reading apertured cards of varying thicknesses, comprising:

a frame including a pair of bearing plates, a card receiving means mounted to said frame, each of said bearing plates having a bearing member provided therethrough with an elongated aperture, a read head, a plurality of resilient electrical contacts mounted in said read head and projecting toward said card receiving means, guide pins on said read head displaceably received in corresponding ones of said elongated apertures in said bearing members, one of said bearing members provided with first biasing means engaging and biasing said read head into alignment with respect to said frame, second biasing means mounting said read head to said bearing plates and continuously biasing said read head away from said card receiving means, and motive power means coupling said read head to said frame for movement of said read head toward said card receiving means in opposition to the biasing of said read head by said biasing means.

2. The structure as recited in claim 1, 2, and further including: circuit means on said card receiving means and engageable by selected ones of said electrical contacts upon displacement of said read head toward said card receiving means.

3. The structure as recited in claim 1, wherein, said motive power means includes a solenoid mounted on said frame, lever means coupled to an armature of said solenoid and pivotally coupled to said bearing members and pivotally coupled to said read head by said guide pins.

4. The structure as recited in claim 1, wherein, said second biasing means includes a pair of leaf springs, each coupled to said read head and resiliently engaged against one of said bearing plates, said leaf springs being resiliently deflected upon displacement of said read head toward said card receiving means.

5. The structure as recited in claim 1, and further including: a card ejection mechanism slidably mounted to said frame and positioned to engage a card received by said card receiving means, said ejection mechanism including an energy storage means for storing energy upon receipt of a card in engagement therewith, and for releasing said stored energy to at least partially ejectg said card from said card receiving means.

6. The structure as recited in claim 1, and further including: control means coupled to said motive power means for actuating said motive power means to move said read head toward said card receiving means, said control means including means for sensing the presence of a card received by said card receiving means before actuating said control means.

7. A card-reader, comprising:

a frame, a read head having at least a pair of leaf springs overlying said frame, said leaf springs suspending said read head on said frame, circuit carrying means mounted on said frame initially in spaced relationship from said read head, said read head having a plurality of electrical contacts depending therefrom for electrical engagement on said circuit carrying means, a rigid lever having a pair of arms pivotally mounted to said frame, means mounting said read head to said arms, a solenoid operatively connected to said lever for pivoting said lever about said arms and for displacing said read head toward said circuit carrying means for electrical engagement of said contacts on said circuit carrying means, said leaf springs being resiliently yieldable to allow displacement of said read head with respect to said frame as said lever is pivoted about said arms.

8. The structure as recited in claim 7, and further including:

bearing means mounted on said frame, said means mounting said read head to said arms including pins connecting said read head and said arms, said pins passing through said arms and received respectively in elongated apertures provided in said bearing means.

9. The structure as recited in claim 7, and further including:

a resilient member in resilient compression between a portion of said frame and said read head for biasing said read head into desired alignment against another portion of said frame.

* * * * *

UNITED STATES PATENT OFFICE
CERTIFICATE OF CORRECTION

PATENT NO. : 3,916,156
DATED : October 28, 1975
INVENTOR(S) : RAYMOND VINCENT PASS ET AL It is certified that error appears in the above-identified patent and that said Letters Patent are hereby corrected as shown below:

Column 8, line 31, Claim 2, "claim 1, 2" should be ---claim 1---.

Column 8, line 55, Claim 5, "ejectg" should be ---eject---.

Signed and Sealed this

*third* Day of *February 1976*

[SEAL]

*Attest:*

RUTH C. MASON
*Attesting Officer*

C. MARSHALL DANN
*Commissioner of Patents and Trademarks*